(12) United States Patent
Chini (10) Patent No.: US 10,932,408 B2
(45) Date of Patent: Mar. 2, 2021

(54) APPARATUS FOR PRECISION VOLUMETRIC METERING AND DISTRIBUTION OF SOLID INPUTS USED IN AGRICULTURE

(71) Applicants: Janice Silvestri, Passo Fundo (BR); Samara Toscani Chini, Canoas (BR)

(72) Inventor: José Oscar Chini, Canoas (BR)

(73) Assignees: Janice Silvestri, Passo Fundo (BR); Samara Toscani Chini, Canoas (BR)

( * ) Notice: Subject to any disclaimer, the term of this patent is extended or adjusted under 35 U.S.C. 154(b) by 149 days.

(21) Appl. No.: 16/060,932

(22) PCT Filed: Nov. 3, 2016

(86) PCT No.: PCT/BR2016/050279
§ 371 (c)(1),
(2) Date: Jun. 9, 2018

(87) PCT Pub. No.: WO2017/096445
PCT Pub. Date: Jun. 15, 2017

(65) Prior Publication Data
US 2018/0352726 A1    Dec. 13, 2018

(30) Foreign Application Priority Data

Dec. 10, 2015 (BR) .................. 2015030944

(51) Int. Cl.
*A01C 17/00* (2006.01)
*A01C 15/16* (2006.01)
*A01C 7/10* (2006.01)

(52) U.S. Cl.
CPC ............ *A01C 17/006* (2013.01); *A01C 7/102* (2013.01); *A01C 15/16* (2013.01); *A01C 17/003* (2013.01)

(58) Field of Classification Search
CPC ....... A01C 17/006; A01C 17/00; A01C 7/102; A01C 7/10; A01C 7/08; A01C 7/00; A01C 15/16; A01C 15/00; A01C 17/003
See application file for complete search history.

(56) References Cited

U.S. PATENT DOCUMENTS 8,196,534 B2    6/2012  Meyer et al.
2014/0367413 A1  12/2014  Walter

FOREIGN PATENT DOCUMENTS

BR          0303586         5/2005
BR          PI1004691 A2    3/2013

*Primary Examiner* — Christopher J. Novosad
(74) *Attorney, Agent, or Firm* — Cittone Demers & Arneri, LLP; Henry J. Cittone

(57) ABSTRACT

An apparatus to be coupled to sowing devices provides for precision in volumetric metering and distribution of solid agricultural inputs, said apparatus comprising a supporting, hollow housing with a through-hole through which an actuating through axle radially locked to a metering distribution centrifugal turbine extends, and drives the metering distribution centrifugal turbine; and an opening in the floor of the housing leading the agricultural input to an output nozzle. The metering distribution centrifugal turbine comprises cutouts of various shapes forming metering chambers for distributing the agricultural solid input uniformly. A labyrinth is formed by the supporting, hollow housing, the inner grater travel stop and the metering distribution centrifugal turbine. The metering distribution centrifugal turbine allows metering of the solid agricultural input only upon rotation of the metering distribution centrifugal turbine; when the metering distribution centrifugal turbine does not rotate the agricultural solid input is retained in and on the turbine.

10 Claims, 9 Drawing Sheets

APPARATUS FOR PRECISION VOLUMETRIC METERING AND DISTRIBUTION OF SOLID INPUTS USED IN AGRICULTURE

FIELD OF THE INVENTION

The present invention belongs to the field of the apparatuses for volumetric metering and distribution of agricultural solid inputs, more specifically, mineral or chemical fertilizers, soil acidity regulators and seeds, such apparatuses being mounted on agricultural machines including planter-fertilizers, seeder-fertilizers and soil acidity regulator dispensers.

BACKGROUND OF THE INVENTION

Apparatuses for distribution and volumetric metering of mineral and chemical fertilizers, soil acidity regulators and seeds are meant to distribute and meter such agricultural solid inputs during the operations of agricultural machinery for soil regulators distribution, mineral and chemical fertilizers metering and seed planting.

Generally speaking, such state-of-the-art devices perform weight metering measurements by applied surface, metering according to the needs of a certain area as defined by the farmer.

It is well-known that the formulation of agricultural solid inputs such as mineral and chemical fertilizers exhibits varied specific weights resulting from the varied chemical compositions of such agricultural solid inputs.

In order to meet the agronomic needs regarding the correct soil regulation and fertilization, mineral and chemical fertilizers are formulated in accordance with each specific application as well as the needs of each farmer. Each formulation can alter, differentiate and change its specific weight, the farmer being unable to meter the correct agricultural input volume in view of the higher or lesser difficulty in adjusting the present metering systems.

Further, the above mentioned specific weight variations, resulting from the different formulations of agricultural solid inputs, combined to the present dispenser systems which do not enable efficient metering, can lead to irregular application of such agricultural solid inputs into soil.

During apparatus shutdown and operations on inclined land having frontal and lateral hillsides besides slopes or rough grounds, brisk moves of machinery during planting and metering of mineral and chemical fertilizers are further drawbacks that cause uncontrolled distribution of said agricultural solid inputs. No matter what kind of metering system is used, with or without level regulator, because the structural geometry of such metering appliances includes an endless screw, such agricultural input metering appliances do not secure accurate metering volumetry. This causes uncontrolled distribution whenever the operation of planting machinery is performed on rough soils, with great moves and impact on the machinery as well as during operations on hillsides and slopes, be them either side or frontal grounds, as well as during machinery shutdowns.

For hillsides planting operations the state-of-the-art mineral and chemical fertilizers dispensers do not meter doses in the required amounts, being frequently unworkable on steep hillsides; while for planting on slopes, such systems enable a higher-than-required metering since they are devoid of any outlet flow control mechanism through the upper or lower agricultural dispenser screw.

Also during shutdowns at the seeding units ends, such systems expel a certain amount of agricultural solid inputs due to the same reason explained above, that is, those are devoid of any system hindering the uncontrolled fall of agricultural solid inputs located at the extreme end of the metering apparatus screw.

It is also known that the present mineral and chemical fertilizers dispensers, through endless, parallel or conic, free or enclosed screws, with or without flow regulator, with or without level regulator, cause pulses of mineral and chemical fertilizers whenever the agricultural machinery to which they are attached is performing planting operations.

Such pulses are generated by the transporting screw end that drives a higher amount of agricultural input at the rotation step at which such end is in an upper position relative to the ground, directing a higher amount of agricultural input at each turn of said screw. Such effect is even more accentuated for machinery provided with a level regulator.

These variations in input amount at each screw turn are at the origin of said pulses, or gulps, implying in irregular application of agricultural solid inputs. Said irregular application is characterized by the distribution of a higher amount of agricultural solid inputs in one segment of the groove or seeding unit and of a lower amount of said agricultural input in another segment. Variations in application, inefficient and irregular, entail and cause many drawbacks to plant development.

At the seeding unit segments that received higher amounts of agricultural input, absorption of same by the plant is hindered by the excessive amount of these nutrients, besides resulting in soil salinization. On the other hand, for the seeding unit segments where metering was lower than required, as defined by the farmer, the plant will not develop satisfactorily in view of lack of nutrients.

Consequent to all the irregular metering situations, because of specific weight variations and difficulty for adjustment and control of state-of-the-art metering devices, combined to the uncontrolled metering with metering pulses, physical-chemical drawbacks to the soil are created. Such drawbacks imply in increased costs for the farmer and reduce crop productivity by the lack of control of volume and weight of the applied agricultural solid inputs.

The patent literature discloses several documents related to mineral and chemical fertilizers dispensers, several of these documents being related to planters and seeders/fertilizers.

It can be seen that in general the object of the said patent documents are directed to improvements in endless screws such as the Brazilian Utility Model patent MU6602114 which relates to an improved endless screw body.

A similar object is also presented by Brazilian Utility Model document MU 8400771-0, highlighting an alleged improvement in functionality at the body of the endless screw.

Brazilian patent document BR9603264-2 teaches a rotating drum metering system having external grooves, the drum being utilized for seed application. Directed to the same functionality is Brazilian patent document BR 0803497-4 A2. Both documents BR 9603264-2 A and BR 0803497-4 A2 relate to the same function of seed distribution but have different distinguishing features.

Brazilian patent document BR 0400933-9 A relates to a screw dispenser having a side outlet comprising a side level regulator, said outlet having been devised to lessen the pulse or gulp drawbacks caused by the endless screw system.

The scrutiny of such state-of-the-art documents demonstrates that the screw metering system is by definition deficient and implies in metering drawbacks during field operation. It should be pointed out that in spite of the solution suggested by the above document, the side level regulator keeps the solid input inside the dispenser device, while the input build-up keeps on generating pulses and gulps, no matter the level regulator has a side or frontal outlet relative to the endless screw.

Although all of the cited documents relate to mineral and chemical fertilizers dispensers, all differ from the object of the present Application since the present apparatus comprises a distribution and metering centrifugal turbine provided with metering chambers, its nature being therefore distinguished from any state-of-the-art document referred to above in the present specification. In a non-suggested and non-described manner, either in separate or combined state-of-the-art documents, the apparatus object of the present Application is endowed with the function of when in rotational movement being able of accurately establishing the agricultural solid inputs metering and when static, being closed and shut. Such function is completely absent from any state-of-the-art document.

Therefore, it would be highly useful for the technique and the agriculture in general terms to make available an accurate system for mineral and chemical fertilizers metering to be employed in planters/fertilizers, seeders/fertilizers and fertilizers dispensers, aiming at the regularity of metering both in slopes and frontal and side hillsides relative to the seeding units and which in operation keeps the metering volumetrically regular without any pulses and variations and without involuntary fall of agricultural solid input during shutdowns or at the travel stop of the seeding unit.

SUMMARY OF THE INVENTION

Broadly the apparatus for metering and volumetric distribution of solid agricultural solid inputs to be employed in planting machinery, including planters/fertilizers, seeders and soil acidity regulators machinery according to the invention comprises:

a) a supporting, hollow housing comprising an upper section and a lower section, designed for containing such agricultural solid inputs, the upper section of same being flat for connection with the planting machinery and the lower section being of cylindrical shape in coincidence with a metering distribution centrifugal turbine, said supporting, hollow housing having a through-hole for traversing an actuating through-axle radially locking said metering distribution centrifugal turbine, a bearing being mounted on said housing, the floor of said hollow housing being provided with an outlet opening to convey the solid agricultural input up to an output nozzle towards the soil;

b) wherein said metering distribution centrifugal turbine is accommodated within said supporting, hollow housing, the body of said metering distribution centrifugal turbine being shaped into a nonhollow section and a hollow chambers' section or metering chambers of identical volumetric and geometric sizes, the nonhollow section delimiting said metering chambers so that when one metering chamber is coincident with the agricultural solid input outlet opening of said hollow housing the agricultural solid input is expelled towards the soil, while the agricultural solid input which is out of the metering chamber which is coincident with the said outlet opening will be retained in the adjacent metering chambers, the metering volume being pre-determined by the constructive geometry of said metering chambers, the solid agricultural inputs being displaced and conveyed through successive metering chambers under continuous cycling of same towards the lower section of said metering distribution centrifugal turbine, said turbine performing metering only when under rotational movement;

c) in the lower, inner section of said metering distribution centrifugal turbine and attached to a cover, a grater travel stop for withdrawal of the agricultural solid input which is out of the metering chambers of said metering distribution centrifugal turbine and designed to create, together with the hollow housing, a passage labyrinth, to gauge or calibrate the volumetric amount of the agricultural solid input and consequently the weight, acting as shutter and closing system for the outlet opening of said hollow housing when the metering distribution centrifugal turbine is in the inertial or static state so that in the absence of rotational movement the agricultural solid input will be retained inside said labyrinth, within the metering distribution centrifugal turbine and on the same;

d) an actuating through-axle radially locked relative to said metering distribution centrifugal turbine, mounted on bearings at both ends, with one external bearing mounted on the hollow housing and another bearing attached to said cover, said actuating through-axle being provided with roller bearings attached to said supporting hollow housing and said cover; said axle being mounted transversally and through the hollow housing and said cover, and being cooperative with said metering distribution centrifugal turbine so that said metering distribution centrifugal turbine is cooperative with the actuating through-; and where said axle receives a rotational force straight from the planting machinery kinematic system, developing a turbine-controlled rotational movement that associated with the regular geometrical figures of the metering chambers results always in the same volume among the metering chambers, promoting metering regularity and agricultural solid inputs homogeneity and consequent absence of variable pulses or gulfs; and e) a discharge system, comprising an output nozzle for connection with a conveying pipe for conveying the agricultural solid input up to the soil, the inner section of said nozzle having the shape of the solid agricultural input to be metered, that is, a rectangle, a lozenge, a square, a circle or any geometric shape coincident with the apparatus's outlet opening.

Once the solid agricultural input is expelled by one of the metering chambers of the lower section of said metering distribution centrifugal turbine, the subsequent metering chamber is able to convey further metering material, and after this further material is expelled said metering chamber will be empty again and ready to receive a fresh portion of material do be metered. In this way there is established a constant cycling which entails a regular, accurate, continuous and uniform volumetric distribution of the solid agricultural inputs to be metered, without any pulses and volume variations.

The purpose of the metering distribution centrifugal turbine of the apparatus of the invention is to transfer the solid agricultural input from the upper section of the apparatus, where it is stored, and up to the lower section of same, where the discharge or output nozzle is positioned, this in turn being connected to a conveying pipe for the solid agricultural inputs to be metered and up to the soil. The conveying pipe is a state-of-the-art device and as such is not an object of the invention.

Centrifugation is created by the combination of the metering chambers of said metering distribution centrifugal turbine with said grater and the so-formed labyrinth, gauging the volumetric amount of the solid agricultural input and consequently its weight, working as shutter and closure system when in the inertial or static state.

The metering distribution centrifugal turbine, when operating in rotational movement, that is, when it is working, enables the passage of said solid agricultural inputs throughout said metering chambers, the structural geometry of which comprises homogeneous sizes and is selected among rectangles, lozenges, squares, circles or several other shapes as required, so as to meet all the geometries, weights and volumes required for the metering operation in the field of the several kinds of solid agricultural inputs to be metered.

It is within the purposes of the invention to provide that the axle and metering distribution centrifugal turbine actuation system enable the volumetric and accurate metering of solid agricultural inputs including any other products required for the metering and planting of seeds into the soil have as constructive feature all the possible ways of assembling. Thus, the said metering distribution centrifugal turbine coupling is performed either transversally or perpendicularly to the solid agricultural input container, according to the requirements of the device where it will be employed.

Advantageously, in an alternative embodiment of the invention, the compact structural geometry of the present apparatus also enables the direct assembling of same to the seeding unit, over the seeds dispenser system or over the furrow cutting unit. This embodiment and assembling mode is designed for the application of powdery mineral, chemical and biological fertilizers, biological regulators combined to seeds, these powdery inputs being of fine granulometric size and low amount to be applied in weight and volume by hectare during the planting operation.

The actuation of the distribution and volumetric metering apparatus for mineral and chemical fertilizers, soil acidity regulators and seeds according to the invention mounted on the seeding or furrow cutting units is obtained through the agricultural machinery kinematic system.

Whenever mounted directly on the seeding unit and on the seeds distribution system, or even on the furrow cutting unit, the distribution and volumetric metering apparatus for mineral and chemical fertilizers, soil acidity regulators and seeds according to the invention may be coupled to smaller containers for the distribution of specific products to be laid on the soil in small amounts.

Further, the compact shape and the through-axle of the present apparatus make it possible a tandem, side by side assembly, the more than one unit assembly being employed either on the seeding unit or on the furrow cutting unit or still straight on the mineral and chemical fertilizers container.

The apparatus of the invention provides an actuating through-axle and cooperating with it, the said metering distribution centrifugal turbine for distribution and metering of solid agricultural inputs. The structural geometry of said actuating through-axle is either massive or has a hollow center of square, hexagonal, round or any other possible geometric form, in agreement with the requirements of the actuating through-axle transmission.

The metering of solid agricultural inputs to be performed by said metering distribution centrifugal turbine is obtained with the aid of metering chambers that compose said turbine and that possess identical volumetric and geometrical sizes, their shapes being helicoids, rectangular, squared, round or any shape required for the desired end and the specific solid agricultural inputs and their-respective volumes to be metered.

The metering volume is pre-determined by the constructive geometry of the metering chambers, since their sizes are strictly the same and geometrically regular to secure that the metering of said solid agricultural inputs occurs continuously and at constant weight and volume.

A feature of the centrifuge system of the metering distribution centrifugal turbine is that it works both in the vertical and the horizontal position, since the metering system of the present volumetric distribution metering apparatus for solid agricultural inputs useful for planters/fertilizers, seeders and soil acidity regulators devices is based and guaranteed by said metering distribution centrifugal turbine.

The Applicant, faced to the poor features of the structural geometry of the present distribution apparatuses for solid agricultural inputs, all presenting the serious drawback of being devoid of closing and shuttering systems when in a static state, and consequently do not securing the accurate volumes or weights of said solid agricultural inputs caused by the variation in specific weights of same, has developed the apparatus which is the object of the invention. It is the aim of the present apparatus to secure the accurate volume and weight to be dispensed under constant regularity along the seeding unit.

As mentioned above in the present specification, the drawback of the state-of-the-art metering systems lies in the fact that such systems do not bear any outlet shutter system, such as a valve, able to actuate when in a static state.

The main feature of the present invention is thus the constant, accurate and controlled volumetric distribution of solid agricultural inputs to be metered during the course of planting with the aid of said metering distribution centrifugal turbine coupled to the actuating through-axle. Said actuating through-axle comprises shapes which can vary from circular, hexagonal, oval, square and rectangular or any other geometric shape required by the device to which it is to be assembled.

According to the invention, all of the transportation movement of the solid agricultural input to be metered occurs in a centrifugal and regular way, since the actuating through-axle-of the present distribution apparatus receives a rotational force straight from the planting machinery kinematic system, developing a controlled movement that, combined with the metering chambers' regular geometric shapes results in the same volume being obtained by the metering distribution centrifugal turbine chambers. This brings high efficiency to the metering system by the regularity of metering, free from variable pulses or gulfs.

The invention provides a labyrinth formed by the metering distribution centrifugal turbine, the inner grater travel stop and the hollow housing which limits and exactly sets the volume and weight of the solid agricultural input in liters per rotation or liters by hectare of the product to be metered. The inner grater travel stop is attached to a cover and is positioned on the inner side of the metering distribution centrifugal turbine to withdraw excess products and solid agricultural inputs to be metered, securing the volumetry as defined by the metering chamber.

The shape of said inner grater travel stop is adjusted to each different kind of agronomic need for metering and distribution of mineral and chemical fertilizers, soil acidity regulators and seeds as required.

Besides, in the static state the metering distribution centrifugal turbine aids in the closure of the outlet opening, in this way avoiding both the involuntary spilling and the generation of pulses of solid agricultural input, which aids in reducing inputs waste or loss.

As structuring element of the present apparatus a supporting, hollow housing is provided for supporting all of the components of the metering and distribution device for mineral and chemical fertilizers, soil acidity regulators and seeds.

The supporting, hollow housing comprises varied shapes and can be manufactured from different materials, being provided with distinct bore positions to be connected to several kinds of containers. The supporting, hollow housing can be connected to all kinds of agricultural machinery, including planters/fertilizers, seeders/fertilizers, state-of-the-art mineral and chemical fertilizers metering devices, being useful both for the original machinery market, that is, new machinery, as well as for the second-hand and refurbished machinery.

For seed distribution the geometry of the metering distribution centrifugal turbine hollow chambers is pre-determined by the variables of the cultivars, which comprise soybeans, corn, wheat, rice, sorghum, canola, pasture seeds and all of the plants which make up the primary agribusiness production chain.

The invention provides a actuating through-axle mounted on roller bearings, those in turn being mounted on the supporting, hollow housing and cover, said actuating through-axle being installed transversally and piercing the said hollow housing and cover. Said bearings are mounted (attached) on the cover and on the hollow housing with the aid of any fixation means. Alternatively, they can be integrated to said cover or to said hollow housing by manufacture.

The structural geometry of the present apparatus enables the assembly of several distribution devices in series, side-by-side, for the distribution of several different kinds of solid agricultural inputs.

According to the transversal embodiment of the invention, the actuating through-axle actuation system and metering distribution centrifugal turbine are provided so that the metering distribution centrifugal turbine rotation is in the same direction as the agricultural machinery displacement, that is, the metering distribution centrifugal turbine rotates in the same direction as the agricultural machinery wheels.

On the contrary, in the perpendicular embodiment of the apparatus of the invention the metering distribution centrifugal turbine also rotates perpendicularly relative to the agricultural machinery displacement direction.

The invention provides a control system for the flow rate fine tuning by the system rotational variation based on the agricultural machinery to which the distribution system is coupled, since said rotational movement, combined with the metering chambers, inner grater and labyrinth and the outlet opening enables a regular metering frequency at the lower section of the distribution device which is placed before the output nozzle and conveying pipe which conveys any products and agricultural inputs to be metered up to the soil.

This is a further advantageous aspect of the invention, since in state-of-the-art devices in spite of the fact that flow rate is also regulated by rotational variation, screws of different pitches must be changed and flow reduction agents must be added, such procedures being completely absent by making use of the inventive apparatus 100.

Said flow rate fine tuning can be augmented or reduced until complete closure, according to the need of adjustment for better volumetric distribution of mineral and chemical fertilizers, soil acidity regulators and seeds, especially seeds known as fine grain seeds.

The invention can be altered further without altering the scope of its inventive concept in order to be adapted to the different models of planters/fertilizers, seeders/fertilizers, kinds and versions of metering devices for mineral and chemical fertilizers and soil acidity regulators as well as all seeds existing in the market and for all kinds of cultivated crop.

Advantageously, in the inventive apparatus, the rotational movement of the metering distribution centrifugal turbine enables crushing of soil lumps and homogenization of the agricultural solid inputs, strongly minimizing or making it nearly impossible the occurrence of soil compaction besides securing that all of the material within said metering distribution centrifugal turbine is delivered in a continuous and regular way to avoid both build-ups and losses, without metering pulses.

BRIEF DESCRIPTION OF THE DRAWINGS

FIG. 1 depicts a frontal orthogonal view of the assembled device for the accurate metering and volumetric distribution of agricultural solid inputs according to the invention.

FIG. 2 depicts an orthogonal view of the right side of the same apparatus of FIG. 1.

FIG. 3 depicts an orthogonal view of the rear of the same apparatus of FIG. 1.

FIG. 4 depicts an orthogonal view of the left side of the same apparatus of FIG. 1.

FIG. 5 depicts a right top perspective view of the same apparatus of FIG. 1.

FIG. 6 depicts a left top perspective view of the same apparatus of FIG. 1.

FIG. 7 depicts an orthogonal view of the lower section of the same apparatus of FIG. 1.

FIG. 8 depicts an orthogonal view of the upper section of the same apparatus of FIG. 1.

FIG. 9 depicts an exploded view of the same apparatus of FIG. 1, depicting a preferred embodiment of the invention.

FIG. 10 depicts a perspective view of the metering distribution centrifugal turbine with various kind of axles and metering chambers of the apparatus of the invention.

FIG. 11 depicts a cut section representing the working principle of the apparatus of the invention.

FIG. 12 depicts a cut section representing the working principle of the labyrinth of the apparatus of the invention.

FIG. 13 depicts an exploded view of the apparatus of the invention picturing another preferred embodiment of same.

FIG. 14 depicts a right top view of the apparatus of the invention with lateral actuation.

DETAILED DESCRIPTION OF THE INVENTION

The invention will be described below by reference to the attached Figures, which should not be construed as limiting same.

As of FIG. 1, the present apparatus is generally represented by numeral 100. Generally, the two distinct preferred embodiments of the invention are represented by FIGS. 9 and 13 as exploded views.

FIG. 9 is the most preferred mode of the invention, the actuation being by the through-axle. This mode is preferably directed to new devices built in agreement with the concept of the present invention.

On the other hand FIG. 13 depicts the embodiment with lateral-perpendicular actuation. This mode is directed to providing the inventive apparatus to the replacement market of existing plantation machinery. Such agricultural planting machinery makes use of lateral-perpendicular actuation.

According to the invention, the expression “solid agricultural inputs” or simply “solid inputs” refer to mineral and chemical fertilizers, soil acidity regulators and seeds.

Generally speaking, the hollow housing 1 is a supporting, hollow part having an upper section and a lower section, the upper section of same being flat for connection with the planting machinery (not represented) while the lower, cylindrical section is coincident with a metering distribution centrifugal turbine 4.

Figure 9:
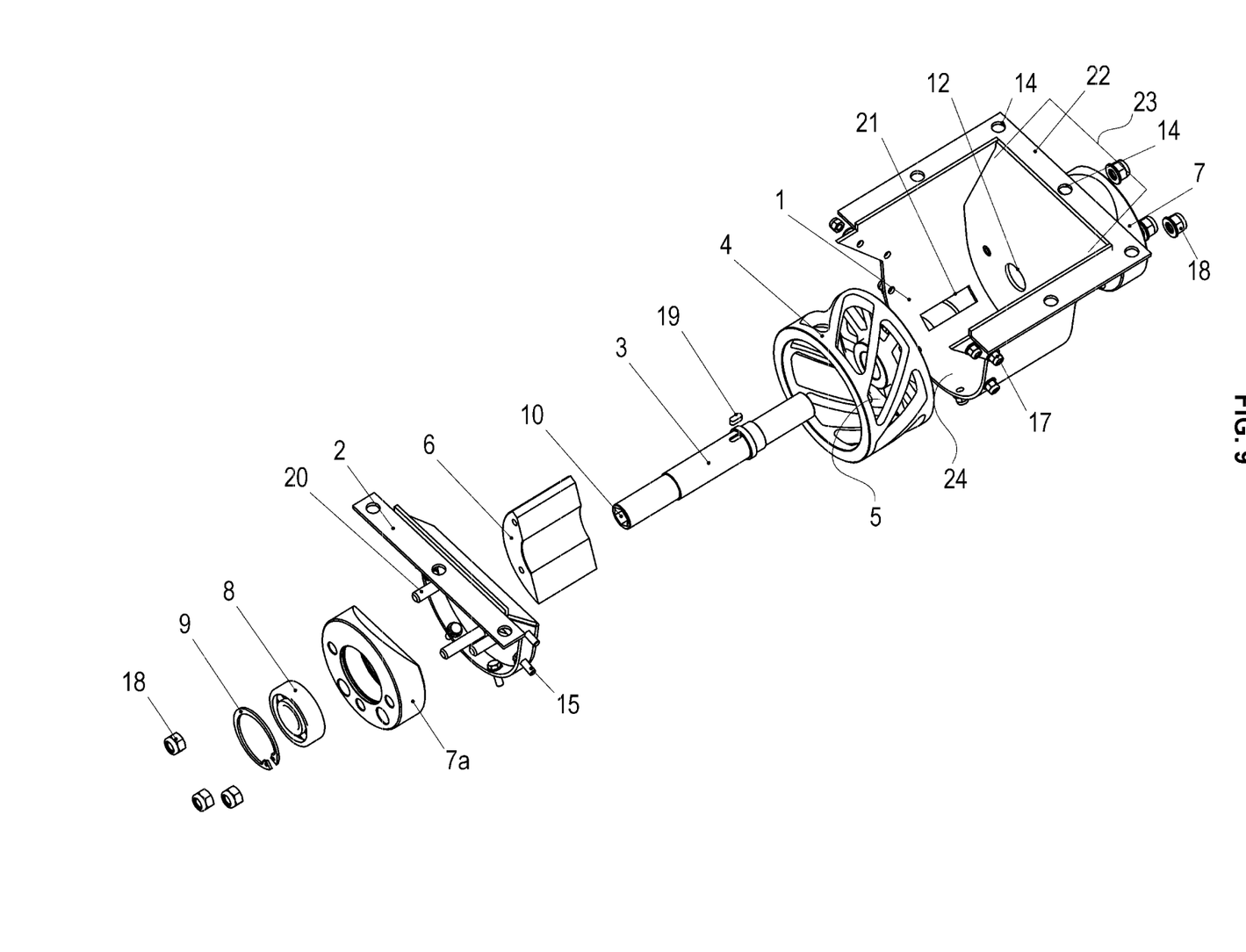

The supporting, hollow housing 1 is provided with a) a through-hole 12 to traverse an axle 3 radially blocked to the metering distribution centrifugal turbine 4 by key 19, axle 3 being aimed at driving said metering distribution centrifugal turbine 4; and b) outlet opening 21 (FIG. 9) at the floor of said supporting, hollow housing 1 to convey the agricultural input 31 up to the output nozzle 13. Further, supporting, hollow housing 1 lodges a bearing 7. A cover 2 houses an inner grater 6 and a bearing 7a, all elements being traversed by axle 3.

The geometry of metering distribution centrifugal turbine 4 comprises a section 32 and a hollow section, the hollow section being provided with cutouts of several shapes, forming metering chambers 5 that uniformly distribute the solid agricultural input 31.

The metering chambers 5 of metering distribution centrifugal turbine 4 convey the agricultural solid input 31 throughout labyrinth 25 formed by supporting, hollow housing 1, inner grater 6 and metering distribution centrifugal turbine 4, the agricultural solid input 31 being expelled through output nozzle 13. The nonhollow section of metering distribution centrifugal turbine 4 limits said metering chambers 5 so that when one chamber 5 is coincident with the outlet opening 21 of said supporting hollow housing 1 the agricultural solid input 31 will be expelled towards the soil, while the solid agricultural input 31 which is outside of said metering chamber 5 and is not coincident with said opening 21 will be retained in the adjacent metering chamber 5.

The foregoing description depicts the shutter process as performed by the apparatus 100 of the invention. It should be noted that such principle is a distinguishing feature of the apparatus 100 of the invention, and is not to be found in any state-of-the-art document.

The apparatus of the invention for the accurate metering and volumetric distribution of agricultural solid inputs and generally designed by numeral 100 (FIG. 1) comprises as structuring element supporting, hollow housing 1 for supporting all of the elements of the system, said supporting, hollow housing 1 being provided with flange 22 and holes 14 for attachment of apparatus 100 to the planting and metering machinery of agricultural inputs (not represented).

Figure 1:
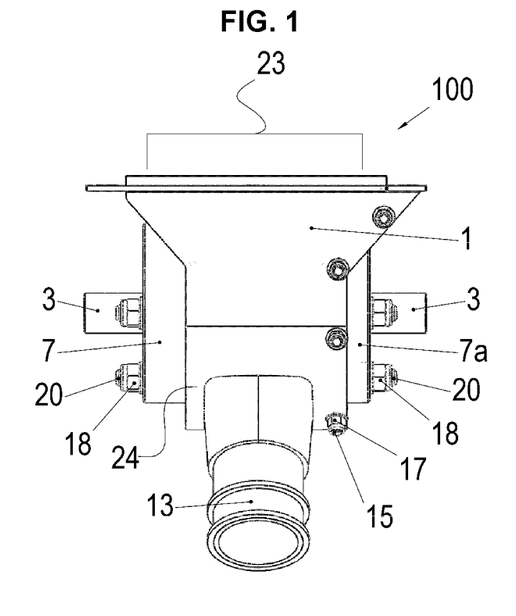
Figure 2:
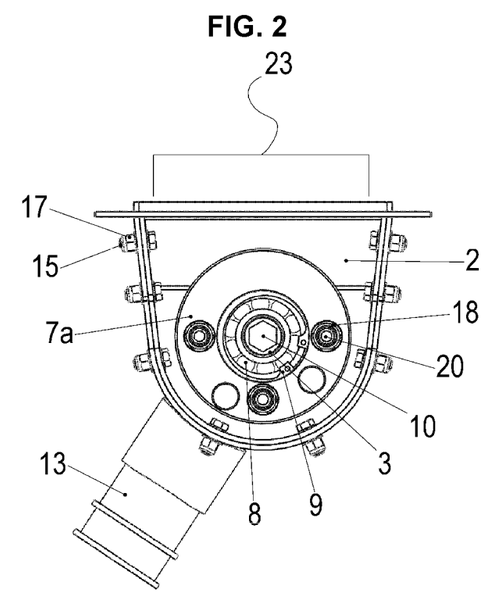
Figure 3:
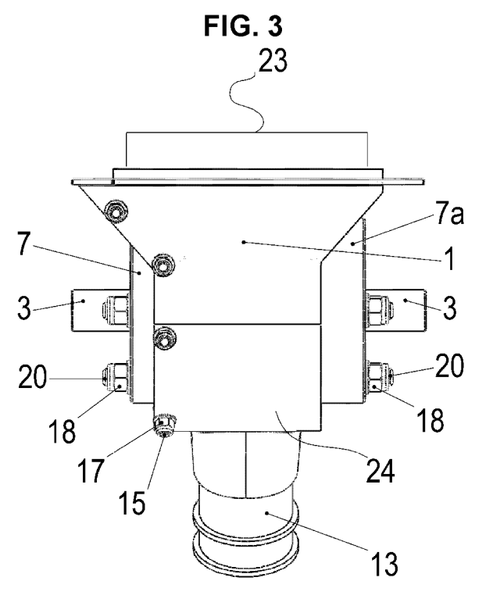
Figure 4:
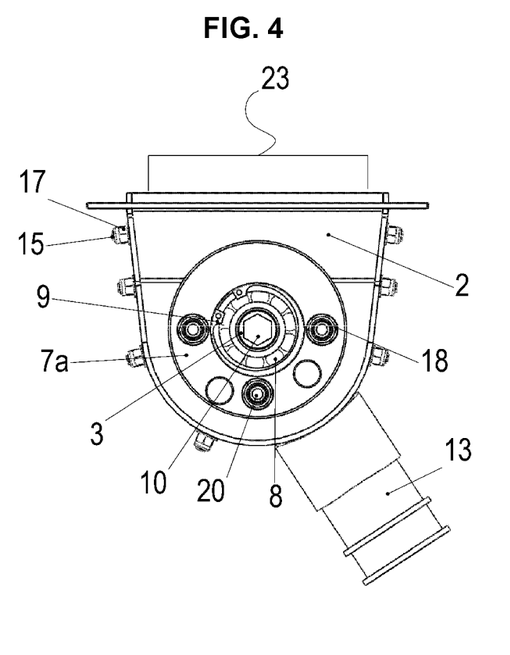
Figure 5:
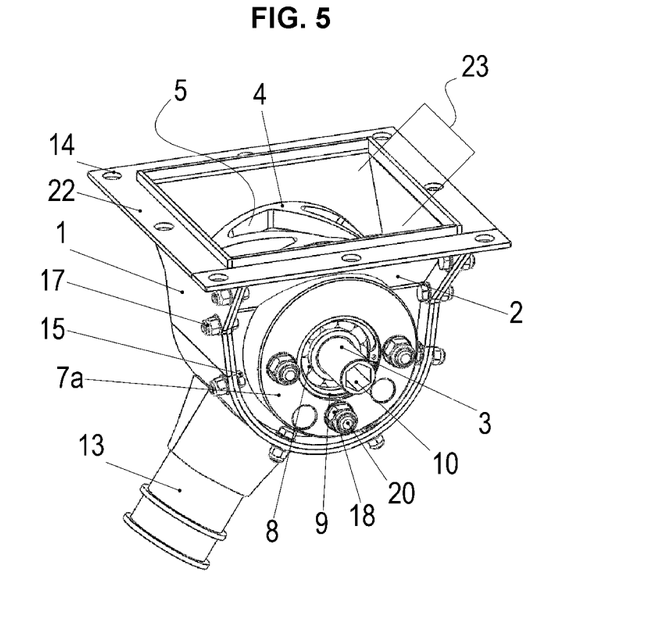
Figure 6:
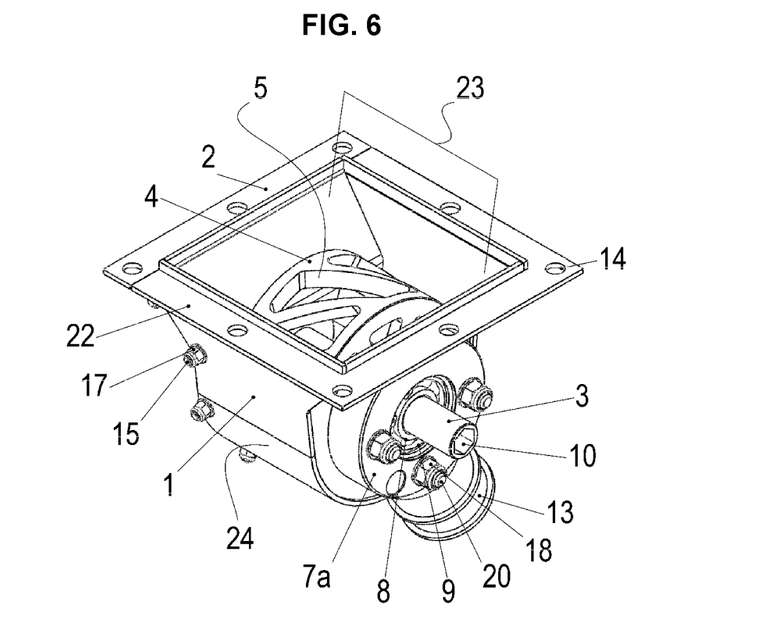
Figure 7:
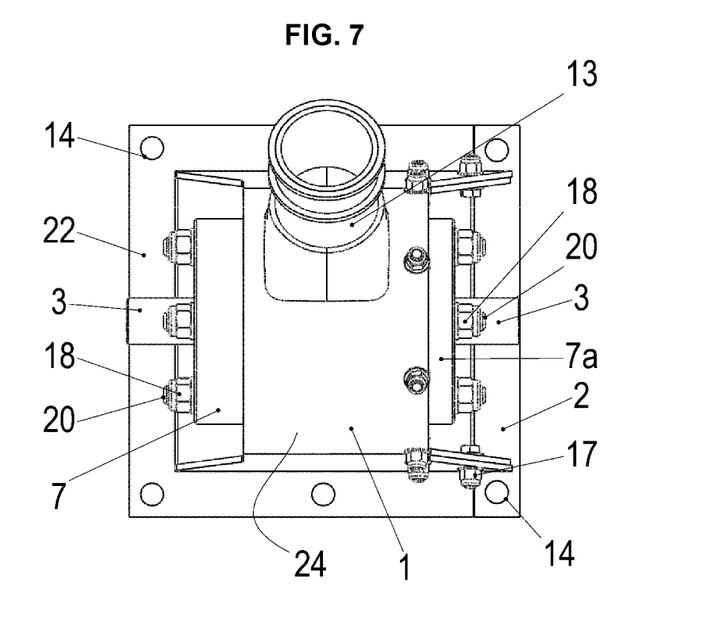
Figure 8:
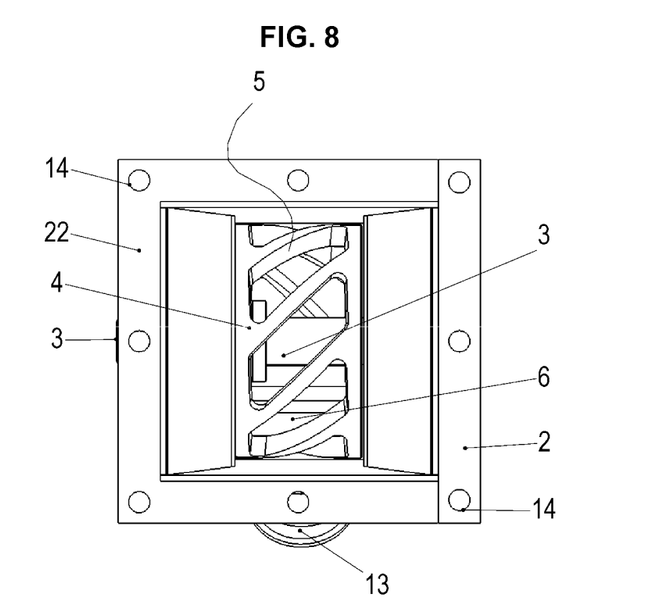

The side section of said supporting, hollow housing 1 bears a through-hole 12 designed for the passage of actuating through-axle 3. A closing cover 2 makes one side of a rectangle at the upper section of supporting, hollow housing 1, the other three sides of the said rectangle being formed by flange 22. Supporting, hollow housing 1 is generally a portion of the present apparatus 100, it being similar to other state-of-the-art housings.

Figure 13:
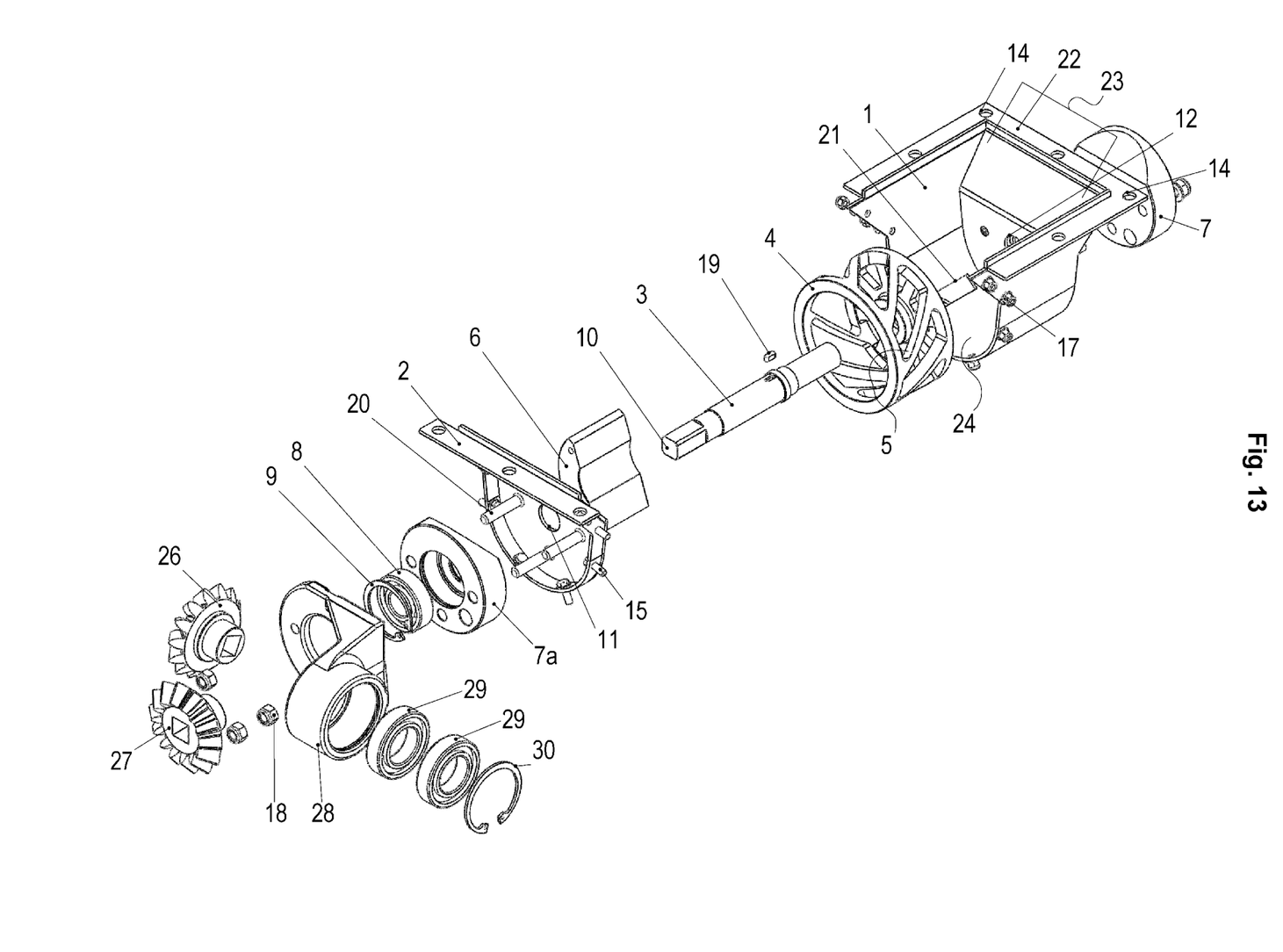

Cover 2 comprises an upper section constituted by a horizontal plate and hole 14 for connection with the agricultural machinery (not represented) and a lower section as a semi-circle provided with a through-hole 11 for actuating through-axle 3, and engages bearing 7a and roller bearings 8 with blocking rings 9, said cover 2 being connected to supporting, hollow housing 1 with the aid of fixation means 15 and 17. See FIGS. 9 and 13.

Actuating through-axle 3 traverses roller bearing 8, hole 11 of cover 2, through-hole 12 of supporting, hollow housing 1 as well as the radial center of the metering distribution centrifugal turbine 4. Actuating through-axle 3 is radially locked to metering distribution centrifugal turbine 4 with the aid of key 19.

The inner grater 6 is attached to cover 2 and withdraws excess material which fills chambers 5. This enables the accurate volumetric metering of the agricultural input while turbine 4 is in a state of movement.

On the other hand, in a static state said grater 6 works as the system shutter, hindering the involuntary exit of agricultural input 31 throughout the volumetric opening outlet 21 which leads up to the output nozzle 13.

The geometric shapes of said metering chambers 5 of said metering distribution centrifugal turbine 4 (FIG. 10) are variable, being helicoids 5, rectangle 5a, circle 5b, square 5c or even any other geometric shape as required by the different uses and needs to perform the metering and distribution functions of said agricultural solid inputs 31.

Figures 10, 10A, 10B, 10C, 10D:
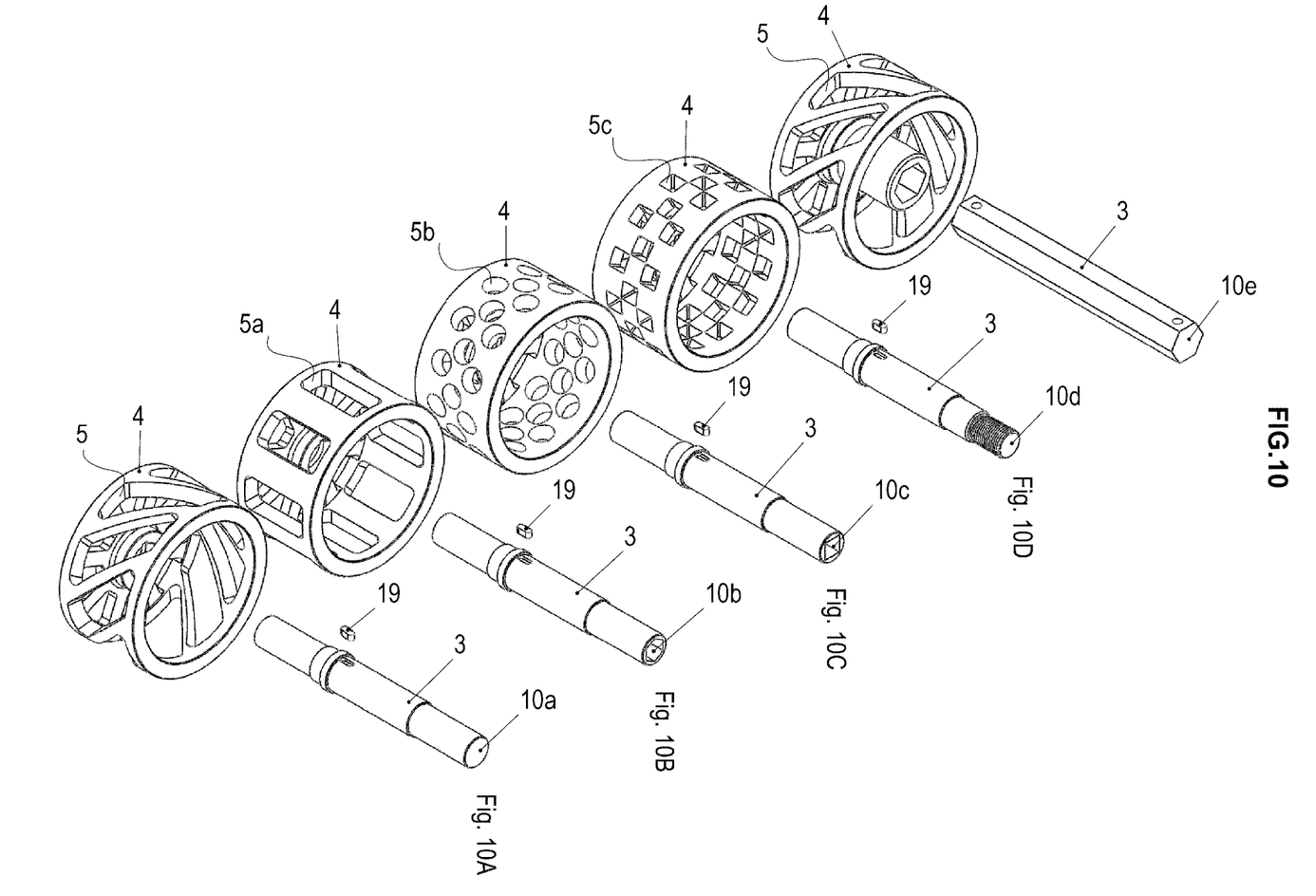
Figure 11:
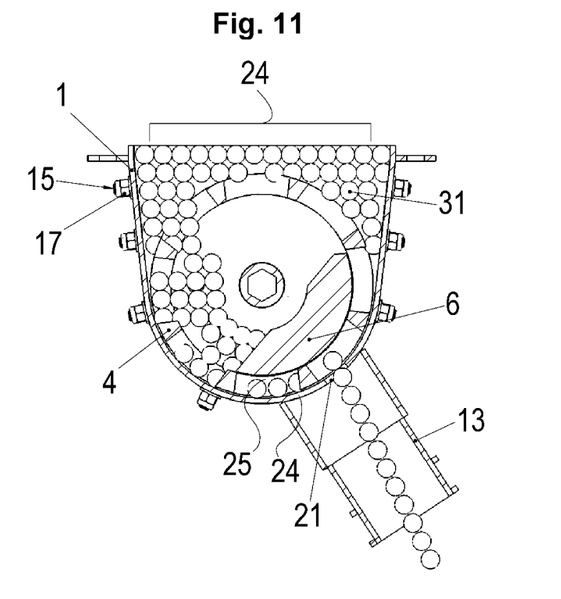

As regards actuating through-axle 3, it admits several constructive concepts such as solid 10a, hexagonal through-hole 10b, square through-hole 10c, internal or external attachment threads 10d, or any other formats as required by special purposes (see FIG. 10).

The kinematic movement created by the agricultural machinery is conveyed to said actuating through-axle 3 locked at said metering distribution centrifugal turbine 4 with the aid of ends of 10a, 10b, 10c, 10d of said actuating through-axle (3). The kinematic movement is conveyed to the volumetric distribution apparatus 100 of the invention by means of square or hexagonal couplings, chains, gears or any other actuating means designed for driving the rotation of metering distribution centrifugal turbine 4.

Figure 12:
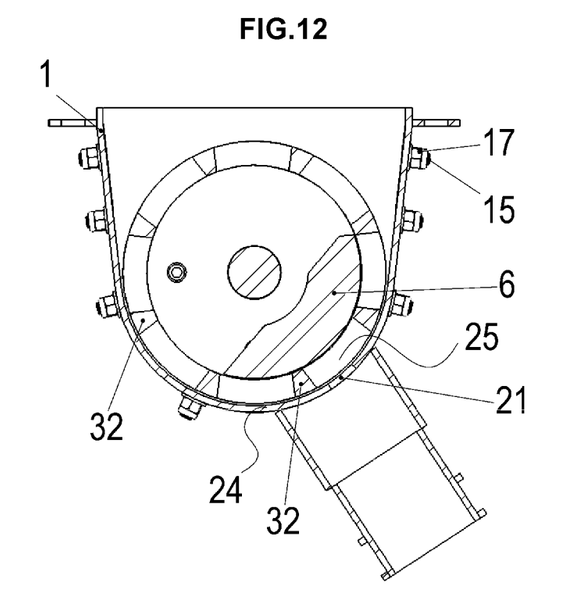

In operation, metering distribution centrifugal turbine 4 receives the solid agricultural input 31 to be metered, and conveys same throughout the metering chambers 5 up to the lower section 24 of hollow housing 1, the excess of solid agricultural input 31 being withdrawn by the inner travel stop grater 6. This enables metering distribution centrifugal turbine 4 with its metering chambers 5 to convey solid agricultural inputs 31 throughout labyrinth 25 formed by hollow housing 1, travel stop grater 6 and metering distribution centrifugal turbine 4, the solid agricultural input 31 being expelled through outlet opening 21 up to the output nozzle 13. The shuttering process is as described above in the present specification. See FIG. 12.

Therefore, the metering distribution centrifugal turbine 4 in combination with the inner side of hollow housing 1 and the outer side of the travel stop grater 6 forms labyrinth 25 and performs, with the aid of the nonhollow section 32 of metering distribution centrifugal turbine 4 the shuttering and closing function for involuntary or non-programmed exit of the solid agricultural input 31 through the opening of outlet 21 of hollow housing 1 up to the output nozzle 13 when in a static state.

The receiving format of said output nozzle 13 reproduces the geometry which is coincident with that of outlet opening 21 of hollow housing 1. At the outlet of the solid agricultural inputs 31 to be metered, the geometric shape of nozzle 13 can be adapted for coupling of sleeves, hoses or telescopic pipes (non-represented) of the agricultural machinery and designed for conveying said solid agricultural inputs 31 to be metered up to the soil.

When in operation, the upper section 23 of hollow housing 1 of the present apparatus 100 takes the solid agricultural inputs 31 to be metered, filling up metering chambers 5 with the same volumes and conveying said solid agricultural input 31 throughout labyrinth 25 up to the outlet opening 21.

The rotation movement of the metering distribution centrifugal turbine 4 does not allow volumetric variations of metering because the constructive and working geometry of same performs metering solely when under rotational movement, that is, in the absence of rotational movement the solid agricultural input 31 will be kept within and on said metering distribution centrifugal turbine 4. In this way there is no involuntary or non-programmed metering since the system formed by the metering distribution centrifugal turbine 4, inner grater 6 and hollow housing 1, besides forming labyrinth 25 is in charge of shuttering and closing the outlet opening 21, because of the positioning of these components relative to said outlet opening 21.

This unique and patentably distinguishing feature of the invention, that is, of continuous and regular metering during the rotation movement of the metering distribution centrifugal turbine 4 and of closure of opening outlet 21 of solid agricultural inputs 31 when said metering distribution centrifugal turbine 4 is in a static state, advantageously enables the system to work at constant, regular metering during operations in inclined ground, both in ascending and descending angles, towards right or left side, and performing the accurate and regular metering without volume and weight variations throughout the seeding unit, that is, without pulses in the metering. Such feature is not suggested nor found in state-of-the-art documents.

The guarantee of fine tune in volume and weight of solid agricultural input 31 to be metered is controlled and defined by the variation in slewing rotation of the metering distribution centrifugal turbine 4, distribution with flow reducers, since the apparatus is previously calibrated, the only required adjustment being the rotation adjustment as a function of the need of each plantation.

The concept of the invention comprises further creating a turbulence of said solid agricultural inputs 31 within said metering distribution centrifugal turbine 4 which by centrifugal force avoids the build-up of agricultural inputs 31 at the center of said metering distribution centrifugal turbine 4, cycling the particles of same for filling up the metering chambers 5 and conveying said particles throughout labyrinth 25 to be expelled through opening outlet 21 towards the output nozzle 13 up to the soil.

Further, the rotation movement of the metering distribution centrifugal turbine 4 leads to crushing of soil lumps and homogenization of solid agricultural inputs 31 rendering compaction very difficult or nearly impossible and securing that all the material within said metering distribution centrifugal turbine 4 is continuously and regularly dispensed, avoiding build-ups and losses, without metering pulses.

The assembling and connection of apparatus 100 of the invention for the accurate volumetric distribution for metering of mineral and chemical fertilizers, soil acidity regulators and seeds to the agricultural machinery for planting is performed through flange 22 and attachment holes 14 which enable the coupling of the apparatus 100 to the container boxes of this machinery or still directly at the seeding unit on the seeds distribution system or still on the furrow cutting unit.

Figure 14:
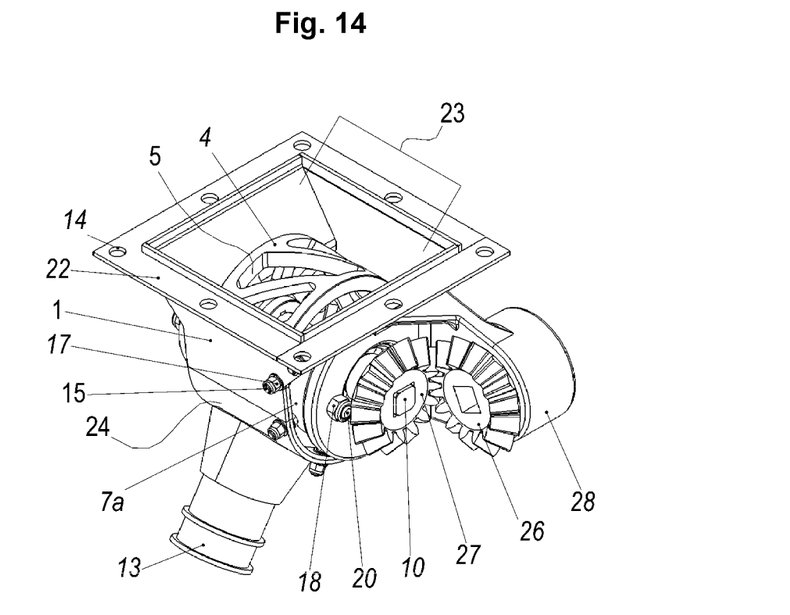

In the embodiment of the invention with perpendicular side actuation (see FIGS. 13 and 14) of the apparatus 100 for accurate volumetric distribution for metering of mineral and chemical fertilizers, soil acidity regulators and seeds 31, a support 28 for conical gears 26, 27 is added, said support 28 being mounted on bearing 7a of cover 2 and attached by screws 20 and nuts 18.

The perpendicular side of support 28 accommodates the conical gear 26 mounted on roller bearings 29 attached to support 28 through fixation ring 30, the conical gear 26 being engaged on axle 3 thus forming the set of perpendicular lateral actuation of apparatus 100. See FIG. 13 and FIG. 14.

The invention claimed is:

1. An apparatus for the accurate metering and volumetric distribution for solid agricultural inputs as applied to planting machinery, said apparatus being characterized by comprising:
   a) a supporting, hollow housing (1), having an upper section and a lower section, for housing said solid agricultural inputs (31) the upper section of said supporting, hollow housing (1) being flat for connection via a flange (22) with the planting machinery while the lower, cylindrical section is in coincidence with a metering distribution centrifugal turbine (4), said supporting, hollow housing (1) being provided with a through-hole (12) designed for traversing an actuating through-axle (3), the floor of said supporting, hollow housing (1) being provided with an outlet opening (21) for conveying said solid agricultural input (31) up to an output nozzle (13) towards soil;
   b) said metering distribution centrifugal turbine (4) being accommodated within said supporting, hollow housing (1), the body of said metering distribution centrifugal turbine (4) being shaped into a non-hollow section (32) and a hollow chambers section or metering chambers (5) of identical volumetric and geometric sizes, the non-hollow section (32) delimiting said metering chambers (5);
   c) in the lower, inner section of said metering distribution centrifugal turbine (4) a grater travel stop (6), attached to a cover (2) and positioned in the inner side of the metering distribution centrifugal turbine (4) for withdrawal of the agricultural solid input (31) which is out of the metering chambers (5) of said metering distribution centrifugal turbine (4) and designed to create, together with supporting, hollow housing (1), a passage labyrinth (25), acting as shutter and closing system for the outlet opening (21) of said supporting, hollow housing (1) when the metering distribution centrifugal turbine (4) is in the inertial or static state;
   d) said actuating through-axle (3) being radially locked relative to said metering distribution centrifugal turbine (4) and mounted on bearings 7 at both ends, with one external bearing (7) mounted on the supporting, hollow housing (1) and another bearing (7a) attached to said cover (2), said actuating through-axle (3) being provided with roller bearings (8) attached to said supporting, hollow housing (1) and said cover (2); said actuating through-axle (3) being mounted transversally and through the supporting, hollow housing (1) and said cover (2) and being cooperative with said metering distribution centrifugal turbine (4) so that said metering distribution centrifugal turbine (4) is cooperative with the actuating through-axle (3); and
   e) a discharge system, comprising an output nozzle (13) the inner section of said nozzle (13) having the shape of the solid agricultural input (31) to be metered, while being coincident with the apparatus's outlet opening (21).

2. The apparatus according to claim 1, characterized in that the cover (2) comprises an upper section comprising a horizontal plate provided with hole (14) for connection with the planting machinery and a lower, semi-circle section provided with a through-hole (11) for the passage of actuating through-axle (3), said cover (2) engaging a bearing (7a) and roller bearings (8) provided with a locking ring (9), said cover (2) being attached to supporting, hollow housing W through fixation means (15) and (17).

3. The apparatus according to claim 1, characterized in that actuating through-axle (3) traverses roller bearing (8), hole (11) of cover (2), hole (12) of supporting, hollow housing (1) and the radial center of metering distribution centrifugal turbine (4) to be radially locked to same with the aid of key (19).

4. The apparatus according to claim 1, characterized in that the geometrical shapes of metering chambers (5) of said metering distribution centrifugal turbine (4) are selected among helicoids (5), rectangles (5a), circles (5b) and squares (5c).

5. The apparatus according to claim 1, characterized in that actuating through-axle (3) comprises constructive concepts such as massive (10a), hexagonal through-hole (10b), square through-hole (10c) or internal or external attachment threads (10d).

6. The apparatus according to claim 1, characterized in that in operation, the metering distribution centrifugal turbine (4) receives the solid agricultural input (31) to be metered, and conveys same throughout the metering chambers (5) up to the lower section (24) of supporting, hollow housing (1), the excess of solid agricultural input (31) being withdrawn by the internal travel stop grater (6), enabling said metering distribution centrifugal turbine (4) with its metering chambers (5) to convey said solid agricultural inputs (31) throughout labyrinth (25) the solid agricultural input (31) being expelled through opening (21) of supporting, hollow housing (1) up to the output nozzle (13).

7. The apparatus according to claim 1, characterized in that for said apparatus (100) to be actuated according to the perpendicular lateral mode, support (28) for conical gear (26, 27) is added, said support (28) being mounted on bearing (7a) of cover (2) and attached by screws (20) and nuts (18).

8. The apparatus according to claim 7, characterized in that the perpendicular side of support (28) accommodates the conical gear (26) mounted on rollers bearings (29) attached to support (28) through fixation ring (30), the conical gear (26) being engaged on actuating through-axle (3) thus forming the set of perpendicular lateral actuation of said apparatus (100).

9. The apparatus according to claim 1, characterized in that bearings (7, 7a) are manufactured integrated respectively either to said supporting hollow housing (1) or to said cover (2).

10. The apparatus according to claim 1, characterized in that, in operation, when one metering chamber (5) is coincident with the agricultural solid input (31) outlet opening (21) of said supporting, hollow housing (1) the agricultural solid input (31) is expelled towards the soil, while the agricultural solid input (31) which is out of the metering chamber (5) which is coincident with said outlet opening (21) will be retained in the adjacent metering chambers (5), the metering volume being pre-determined by the structural geometry of said metering chambers (5), the solid agricultural inputs (31) being displaced and conveyed through successive metering chambers (5) under continuous cycling of same towards the lower section of said metering distribution centrifugal turbine (4).

* * * * *